(12) United States Patent
Unteregger et al.

(10) Patent No.: US 8,556,203 B2
(45) Date of Patent: Oct. 15, 2013

(54) BLENDER SYSTEM HAVING A CUTTER ASSEMBLY

(75) Inventors: Johann Unteregger, Klagenfurt (AT); Juergen Holzbauer, Maria Rain (AT)

(73) Assignee: Koninklijke Philips N.V., Eindhoven (NL)

( * ) Notice: Subject to any disclaimer, the term of this patent is extended or adjusted under 35 U.S.C. 154(b) by 402 days.

(21) Appl. No.: 12/993,267

(22) PCT Filed: May 25, 2009

(86) PCT No.: PCT/IB2009/052175
§ 371 (c)(1), (2), (4) Date: Nov. 18, 2010

(87) PCT Pub. No.: WO2009/144654
PCT Pub. Date: Dec. 3, 2009

(65) Prior Publication Data
US 2011/0101138 A1    May 5, 2011

(30) Foreign Application Priority Data
May 30, 2008   (EP) ...................................... 08157251

(51) Int. Cl.
*A47J 43/046* (2006.01)
(52) U.S. Cl.
USPC ....................................................... 241/282.1

(58) Field of Classification Search
USPC .................... 241/282.1, 282.2, 199.12, 292.1
See application file for complete search history.

(56) References Cited

U.S. PATENT DOCUMENTS

| 3,722,831 A | * | 3/1973 | Bialas et al. ................. 366/291 |
| 4,256,407 A | | 3/1981 | Seiderman |
| 4,493,557 A | | 1/1985 | Nayak et al. |
| 4,911,557 A | * | 3/1990 | Dormer et al. ................ 366/299 |
| 5,520,458 A | | 5/1996 | Arutyunov et al. |
| 6,260,995 B1 | | 7/2001 | Schuchardt |
| 6,802,641 B2 | | 10/2004 | Ladatto et al. |
| 6,846,103 B2 | | 1/2005 | Okamoto et al. |
| 6,981,795 B2 | * | 1/2006 | Nikkah ......................... 366/199 |

FOREIGN PATENT DOCUMENTS

WO   2005011933 A2   2/2005

* cited by examiner

*Primary Examiner* — Mark Rosenbaum (57) ABSTRACT

A blender system (10) includes a base (12) and a container (14). A cutter assembly (24) and a feeder assembly (25) are accommodated in the container (14) near the base (12). The feeder assembly (25) has a feeder blade (628) with a tip (636) at a distal end of the feeder blade (628). The cutter assembly (24) has a cutter blade (28) with a tip (36) at a distal end of the cutter blade (28). A very effective blending process is obtained by driving the feeder tip (636) at a lower peripheral speed than the cutter tip (36).

9 Claims, 7 Drawing Sheets

BLENDER SYSTEM HAVING A CUTTER ASSEMBLY

FIELD OF THE INVENTION

The invention relates to a blender system having a cutter assembly including a cutter blade affixed to a rotationally driveable cutter shaft, which cutter blade has a cutter tip at a distal end radially remote from the cutter shaft and a feeder assembly including a feeder blade affixed to a rotationally driveable feeder shaft, which feeder blade has a feeder tip at a distal end radially remote from the feeder shaft.

BACKGROUND OF THE INVENTION

Multi-blade blender devices are known from International Publication WO 2005/011933A2. A device of WO 2005/011933A2 has a drive shaft, a gear system and blade assemblies. Each blade assembly includes a blade affixed to an end of a blade shaft. The blade shafts are angled from a vertical position towards a container wall. The gear system engages the blade assemblies. The drive shaft engages the gear system and causes the blade assemblies to rotate in operation. The gear system has reduction gears which are implemented in the gear system of the blender. Each blade assembly may be controlled by a separate gear system.

Pureeing, chopping, emulsifying and blending are commonly known operations in a kitchen environment, which can be comfortably accomplished by blender systems. The applications may be very diverse. The blending operation may be performed on blends comprising a mixture of ingredients e.g. for the finishing of a specific recipe or on one ingredient during the preparation of the ingredients. The consistency of the blends is spreading from essentially viscous to fluid. The quantity of the blends and of the material to be blended may vary significantly.

Small quantities of a blend may not be processable, while large quantities may not be completely or homogeneously processed. Frequently, a remedy is sought by opening the lid and stirring the mass or the blend in the container with a piece of cutlery until the process starts again. Especially when the stirring happens when the blades are running, this procedure could become hazardous. The problem is reported to arise mainly in mixtures having a high viscosity.

SUMMARY OF THE INVENTION

It is an object of the invention to provide a blender system of the kind set forth in the opening paragraph that enables an effective blending of viscous mixtures.

According to the invention this object is realized in that the feeder tip is driveable at a lower peripheral speed than the cutter tip.

In the following use is made of the so-called angular velocity, i.e. the rate of angular displacement of a rotating body in a specified direction, such as for example clockwise or anti-clockwise around an axis of rotation. Angular velocity is measured in degrees per unit time, radians per unit time, or revolutions per unit time. As a result of the angular velocity, points of the rotating body, which are positioned at a radius from the axis of rotation, have a peripheral speed. Speed is the time rate of change of position in a particular direction. The magnitude of speed is commonly measured in such units as meters per second (m/s), feet per second (ft/s), and miles per hour (mi/h). The points of the rotating body, which are positioned at a radius from the axis of rotation, describe circular orbits. Peripheral speed is the time rate of change of position of such points in the direction which is tangent to their orbits. The magnitude of the peripheral speed of a point of a rotating body is determined by the product of the angular velocity of the rotating body and the radius from the axis of rotation of the rotating body to the point under consideration.

In state of the art blenders the cutter blades rotate during operation at an angular velocity which is relatively high to enable an efficient blending process. In state of the art blenders such an angular velocity has characteristic values in the range of 9000 to 20000 revolutions per minute. The tips of the blades can be located several centimeters away from the axis of rotation of the shaft to which the tips are affixed. As these tips rotate at the above mentioned high angular velocities their peripheral speed can run up to values of 150 kilometers per hour or even more depending on the load of the blending process and the viscosity of the mixture.

At these high peripheral speeds small scale effects occur in the mixture around the cutting edges and tips. The scale on which these effects occur corresponds to characteristic dimensions of cutting edges and tip shapes as well as on the dimensions of the cutter or feeder blades in radial direction from the axis of rotation. During cutting a force is exerted between the cutting edges and pieces and particles in the blend. It is advantageous for an effective cutting process to apply these forces as high forces or shocks over a short time period. Hence, an effective cutting process at and around the cutting edges is characterized by sufficient impact force between cutting edges and particles in the blend. An impact force is a high force or shock applied over a short time period. Such a force can have a greater effect than a lower force applied over a proportionally longer time period. High peripheral speeds of the cutting edges and tips are needed to generate impact forces which are required for effective cutting.

At a critical value of the peripheral speed of the tips cavities or air bubbles start to arise in the mixture around the cutting edges. As the peripheral speed of the tips increases above the critical value, the amount of cavities and air bubbles increases likewise. If the peripheral speed is too far above the critical value of the peripheral speed, the tips and cutting edges move to a considerable extent or mainly in vain through the cavities or air bubbles, as these cavities are depleted of any mixture to be cut or blended. In such a condition, no fresh blend is transported to the cutting edges and the cutting edges keep circling ineffectively in air bubbles entrapped by the mixture. In such a condition no unprocessed blend is transported in front of the cutting edges and the blending process needs interference of the user to bring unprocessed blend in front of the cutting edges. Especially viscous blends, which have a high resistance to flowing, are characterized by a relatively low critical value of the peripheral speed and the corresponding problems.

Above the critical peripheral speed large scale transport of the mixture is difficult. Especially the tips of the blades and their radial distances to the axis of rotation are important parameters with regard to the critical peripheral speed. Initially, i.e. during a first stage of the blending process, material around the cutter blades may be cut as a result of the impact forces generated by the peripheral speed of the tips. However, in a subsequent phase after the initial phase, an effective circulation—bringing fresh material in front of the cutting edges and maintaining a flow of the blend along the blades—is harmed, stays away or fails to occur because said peripheral speed of the blade tips is above the critical peripheral speed, which gives rise to the generation of air bubbles as described above.

On the one hand, a peripheral speed of the blade tips above the critical value of the peripheral speed is required for the generation of impact forces which generate effective cutting. On the other hand, a peripheral speed which is below the critical value of the peripheral speed is too low to enable effective cutting but prevents the air bubble effect or cavity effect as described above. Below the critical value of the peripheral speed the blades exert a centrifugal force to the blend, thereby swinging the blend or mixture away while at the same time some cutting or pre-cutting may be established by the feeder. By driving the feeder tip at a lower peripheral speed than the cutter tip the feeder assembly effectuates a large scale transport of the mixture while at the same time the feeder assembly can do some cutting or pre-cutting of larger particles. The cutter assembly mainly and effectively cuts the blend which blend is fed by the feeder assembly into the region of action of the cutter assembly. Thus, by driving the feeder tip at a lower peripheral speed than the cutter tip viscous mixtures can be effectively blended.

In a preferred embodiment of the invention the feeder blade has means for transporting the mixture towards the cutter assembly.

The feeder assembly has a cutting function as well as a feeding function. The feeding function can be improved by means for transporting the mixture towards the cutter assembly. The cutting function of the feeder blade can for example be established by a narrow and sharp knife-like projection of the feeder blade in the direction of the peripheral speed of feeder tip. Such a form which can be optimized with respect to pre-cutting of the mixture may be not specifically appropriate for catching and guiding the pre-cut mixture towards the cutter assembly. By the provision of means for transporting the feeding function can be improved. The means for transporting can for example be arranged such that the height of the feeder blade, i.e. its projection in the direction of its peripheral speed, is increased. This can for example be established by attaching a rib to a feeder blade, wherein the rib extends in a radial direction along the feeder blade and in a direction perpendicular to the feeder blade, i.e. a direction which is parallel to the axis of rotation of the feeder blade. Alternatively, the means for transporting can be arranged by folding a portion of the feeder blade, wherein the folding line extends in a radial direction. Alternatively, the feeder blade can be curved in a direction which is perpendicular to the axis of rotation of the feeder blade and perpendicular to the radial direction in which the feeder blade extends. Such structural equivalents have the technical effect that constituents of the blend are caught by the means for transporting because these means extend in a direction which is perpendicular to the surface of the feeder blade. Subsequently the constituents are carried along in a spinning motion around the axis of rotation of the feeder assembly. While being carried along in the spinning motion the means for transporting exert centrifugal forces to the constituents because the means for transporting extend in radial direction of the feeder blade. Under the action of these centrifugal forces the constituents are forced in a radial direction away from the axis of rotation of the feeder assembly towards the cutter assembly.

The height of the means for transporting has an effect on the effectiveness of the blending process. In general the height of the means for transporting, i.e. their dimensions in a direction parallel to the axis of rotation of the feeder assembly should increase when the peripheral speed of the feeder tip decreases. In the range of peripheral speeds of the feeder tip between 10 and 90 percent of the peripheral speed of the cutter tip the height of the means for transporting should be in a range between 8 and 0.5 mm respectively, to enable an effective blending process. In the range of peripheral speeds of the feeder tip between 60 and 80 percent of the peripheral speed of the cutter tip the height of the means for transporting should be in a range between 4 and 2 mm respectively, to enable an effective blending process.

The feeder has a function of transport of the mixture and is driven with an angular velocity at which centrifugal forces are generated between the means of transport of the feeder and the mixture. The practical or actual value of the angular velocity at which the feeder shaft should be driven depends on the feeder tip radius, i.e. the radial distance between the feeder tip and the axis of rotation of the feeder shaft. At a large feeder tip radius the angular velocity of the feeder shaft should be adapted, i.e. decreased, accordingly, because the multiplication product of angular velocity of the feeder shaft and feeder tip radius determines the peripheral speed of the feeder tip.

According to the invention the cutter is driven at an angular velocity at which effective cutting takes place. The practical or actual value of the angular velocity at which the cutter shaft should be driven substantially depends on the cutter tip radius, i.e. the radial distance of the cutter tip to the axis of rotation of the cutter shaft. At a large cutter tip radius the angular velocity of the cutter shaft should be adapted accordingly, because the multiplication product of angular velocity and cutter tip radius determines the peripheral speed of the cutter tip.

In an advantageous embodiment of the blender according to the invention the feeder tip is driveable at a peripheral speed between 60 and 80 percent of the peripheral speed of the cutter tip.

The effect as described above is surprisingly effective if the feeder tip is driven at a peripheral speed in the above specified range. The feeder assembly can have a cutting functionality on top of its effect to provide mixture to the cutter assembly. If the peripheral speed of the feeder tips is very low a transport of very viscous substances still occurs, but the impact of the feeder tip and the mixture is too low to establish cutting or pre-cutting of bits and pieces present in the mixture. This pre-cutting helps to reduce the time and energy which are needed to complete the blending process. The peripheral speed of the feeder tip is optimal for pre-cutting bits and pieces the mixture and subsequently feeding these bits and pieces to the cutter assembly in a workable size. The efficiency of the cutter assembly depends among others on the size of the pieces of solid ingredients which are fed to its blades. The size of the pieces of solid ingredients corresponds to the mass of these pieces and influences the impact interaction between cutting edges and ingredients. The peripheral speed of the tip of the feeder blade also influences the volume flow of pieces of solid ingredients which are fed into the cutter assembly. In the above specified range of the peripheral speed of the feeder tip both the size as well as the volume flow are favorable to obtain an efficient and yet energy-conserving blending process.

If the peripheral speed of the feeder tip is too low, the feeding effect decreases and the time which is needed to create a homogeneous blend increases. The peripheral speed of the feeder tip should be more than 10 percent of the peripheral speed of the cutter tip. If the peripheral speed of the feeder tip is too high, the feeding effect also decreases as explained above because the transport of mixture becomes less effective and the time which is needed to create a homogeneous blend increases. The peripheral speed of the feeder tip should be less than 90 percent of the peripheral speed of the cutter tip.

If the peripheral speed of the feeder tip is increased from 10 percent of the peripheral speed of the cutter tip to 60 percent of the peripheral speed of the cutter tip in steps of 5 percent of the peripheral speed of the cutter tip, respectively 10, 15, 20, 25, 30, 35, 40, 45, 50, 55, 60 percent of the peripheral speed of the cutter tip, the feeding effect improves at every step and the time which is needed to create a homogeneous blend correspondingly decreases at every step.

If the peripheral speed of the feeder tip is decreased from 90 percent of the peripheral speed of the cutter tip to 80 percent of the peripheral speed of the cutter tip in steps of 2 percent of the peripheral speed of the cutter tip, respectively 90, 88, 86, 84, 82, 80 percent of the peripheral speed of the cutter tip, the feeding effect improves at every step and the time which is needed to create a homogeneous blend correspondingly decreases at every step.

Preferably the peripheral speed of the feeder tip is between 60 and 80 percent of the peripheral speed of the cutter tip if the blender is loaded with a blend to be processed. The above values apply to a situation where in the blender is loaded with a mixture of high viscosity. If the blender is unloaded, i.e. running empty, the cutter assembly may be driven at a peripheral speed which is considerably higher than 80 percent, to account for the drop in peripheral speed of the cutter tip when the cutter and a drive unit driving the cutter are loaded by the mixture. The drop in peripheral speed will be dependent of several parameters of the blending system such as the power of the drive unit, the viscosity and amount of the mixture, etc. For an unloaded blender the peripheral speed of the feeder tip is preferably between 40 and 90 percent of the peripheral speed of the cutter tip.

In an advantageous embodiment of the blender according to the invention the means for transporting extend over a distance of less than 4 mm and more than 2 mm from a surface of the feeder blade.

Said dimensions are optimal when driving the feeder tip at a peripheral speed which is between 60 and 80 percent of the peripheral speed of the cutter tip. If the peripheral speed of the feeder tip is increased the extension distance of the means for transporting can be decreased. The effectiveness of the extension distance or the height of the means for transporting depends among others on the peripheral speed on which the feeder tip is driven.

If the peripheral speed of the feeder tip is low, such as 10 percent of the peripheral speed of the cutter tip, the extension distance or height of the means for transporting can have a value of 8 mm for establishing an effective transport. If the peripheral speed of the feeder tip is high, such as 90 percent of the peripheral speed of the cutter tip, the extension distance or height of the means for transporting can have a value of 0.5 mm for establishing an effective transport.

If the peripheral speed of the feeder tip is increased from 10 percent of the peripheral speed of the cutter tip to 60 percent of the peripheral speed of the cutter tip in steps of 5 percent of the peripheral speed of the cutter tip, respectively 10, 15, 20, 25, 30, 35, 40, 45, 50, 55, 60 percent of the peripheral speed of the cutter tip, the height of the means for transporting can be correspondingly and equidistantly decreased, i.e. 8, 7.6, 7.2, 6.8, 6.4, 6.0, 5.6, 5.2, 4.8, 4.4 and 4.0 mm, respectively.

If the peripheral speed of the feeder tip is increased from 60 percent of the peripheral speed of the cutter tip to 80 percent of the peripheral speed of the cutter tip in steps of 2 percent of the peripheral speed of the cutter tip, respectively 60, 62, 64, 66, 68, 70, 72, 74, 76, 78 and 80 percent of the peripheral speed of the cutter tip, the height of the means for transporting can be correspondingly and equidistantly decreased, i.e. 4.0, 3.8, 3.6, 3.4, 3.2, 3.0, 2.8, 2.6, 2.4, 2.2 and 2.0 mm, respectively.

If the peripheral speed of the feeder tip is increased from 80 percent of the peripheral speed of the cutter tip to 90 percent of the peripheral speed of the cutter tip in steps of 1 percent of the peripheral speed of the cutter tip, respectively 80, 81, 82, 83, 84, 85, 86, 87, 88, 89 and 90 percent of the peripheral speed of the cutter tip, the height of the means for transporting can be correspondingly and equidistantly decreased, i.e. 2.0, 1.85, 1.70, 1.55, 1.40, 1.25, 1.10, 0.95, 0.80, 0.65 and 0.5 mm, respectively.

In an embodiment according to the invention the feeder tip is driveable at a peripheral speed, which peripheral speed is varying during blending according to a predetermined pattern.

The centrifugal force which is exerted on the blend by the feeder is varying according to the predetermined pattern. An effective transport can be improved by recognition that the blend contains a mixture of chunks and particles which have a distribution is size, mass and stickiness which is a characteristic property of the blend. On the one hand non-sticky and heavy chunks may easily be thrown away from the feeder blade at a low angular velocity of the feeder blade. On the other hand, small particles of a low mass can persistently stick to the feeder blade which necessitates a different centrifugal force exerted by the feeder blade and a corresponding different peripheral speed of the said feeder blade. By deliberately sweeping the peripheral speed of the feeder blade through a range of peripheral speeds, different constituents of the blend can be transported in an effective way, each constituent having its favored corresponding peripheral speed of the feeder tip. A predetermined pattern can advantageously be used during start-up of the blending process. The predetermined pattern can be adapted to the kind of blend that is prepared. Blends of high viscosity mat require a different pattern than blends of low viscosity.

A predetermined pattern can be advantageously applied at start-up of the blending process to prevent that ingredients start splashing in an uncontrolled way. Such splashing may cause unnecessary spoilage of the blend outside the container or unnecessary contamination of the container. If no predetermined pattern is used, i.e. the blending starts for example at full peripheral speed, pieces and constituents in the blend may be thrown up against the upper walls of the container or a cover of the container and stick there during the remainder of the blending process without being properly processed. If, after processing or blending, the blend is poured out of the container these unblended deposits may be carried along with the processed blend and spoil the quality of the blend. For these reasons it is generally advantageous to have a blender system having a cutter assembly or a feeder assembly including a blade affixed to a rotationally driveable shaft, which blade has a tip at a distal end radially remote from the shaft, wherein the shaft is driveable by a drive unit, wherein the tip is driveable at a peripheral speed, which speed is varying during blending according to a predetermined pattern. This technical feature of a predetermined pattern can also be advantageously used in isolation of a cutter tip which is driveable at a peripheral speed which is lower than the peripheral speed of the cutter tip, i.e. the predetermined pattern will improve the blending process also if the peripheral speeds of the feeder tip and the cutter tip are not driveable according to the invention.

In yet another embodiment of the blender system according to the invention the feeder shaft has a feeder axis of rotation and the cutter shaft has a cutter axis of rotation, wherein the feeder tip has a feeder tip distance to the feeder axis of rotation and the cutter tip has a cutter tip distance the cutter axis of rotation, wherein the difference between the feeder tip distance and the cutter tip distance is less than 75 percent of the cutter tip distance.

As the difference is less than said 75 percent the overall dimensions of the feeder and cutter assembly are similar or at least in the same order of magnitude. If the overall dimensions are equal this has as an advantage that the feeder and cutter blades can be fabricated at lower costs, because the same equipment can be used to produce pieces out of which both the feeder blades and the cutter blades can be made. If the overall dimensions of the feeder blade and the cutter blade are similar, the above discussed advantages of an effective transport and cutting during the blending are especially appreciable. The overall dimensions of the feeder and the cutter at which blending occurs effectively depends among others on the shape of the cutter and the feeder blades. The shape of the feeder blade can e.g. be adapted to envisage an effective transport of ingredients in the blend. Such an adapted shape of the feeder can be distinct from the shape of a cutter. The blades of the feeder and the cutter can be angled with respect to their axes of rotation. Examples of such adaptations in the feeder and the cutter will be described in more detail here below. Generally, said adaptations have an impact on the optimal values for the overall dimensions of the feeder and the cutter and specifically on the feeder tip distance and the cutter tip distance.

Adaptations of the feeder and cutter blades in size, shape and orientation with respect to their axes of rotation can necessitate an optimal value for the feeder tip distance which is different from, meaning not equal to, the cutter tip distance. This is due to asymmetries in the flow pattern which can a large scale transport of mixture along the cutter and feeder assemblies and hence a better mixing. Such asymmetries may easily be induced by using a feeder tip distance which is different from the cutter tip distance. In general, three possibilities exist. In a first possible arrangement the feeder tip distance exceeds the cutter tip distance. In this first arrangement the angular velocity of the feeder axis should be significantly less than the angular velocity of the cutter axis to drive the feeder tip at a lower peripheral speed than the cutter tip. In a second arrangement the feeder tip distance equals the cutter tip distance to compensate for the larger feeder tip distance. In this second arrangement the angular velocity of the feeder axis should be less than the angular velocity of the cutter axis to drive the feeder tip at a lower peripheral speed than the cutter tip. In a third arrangement the feeder tip distance is less than the cutter tip distance. In this third arrangement it may be possible that the angular velocity of the feeder axis equals or exceeds the angular velocity of the cutter axis but the angular velocity of the feeder axis may not be increased to an extent that the peripheral speed of the feeder tip exceeds the peripheral speed of the cutter tip. In general it is advantageous for an effective blending process to use a feeder tip distance which is larger than the cutter tip distance.

BRIEF DESCRIPTION OF THE DRAWINGS

These and other aspects of the blender of the invention will be further elucidated and described with reference to the drawings, in which.

DETAILED EMBODIMENTS

Figure 1:
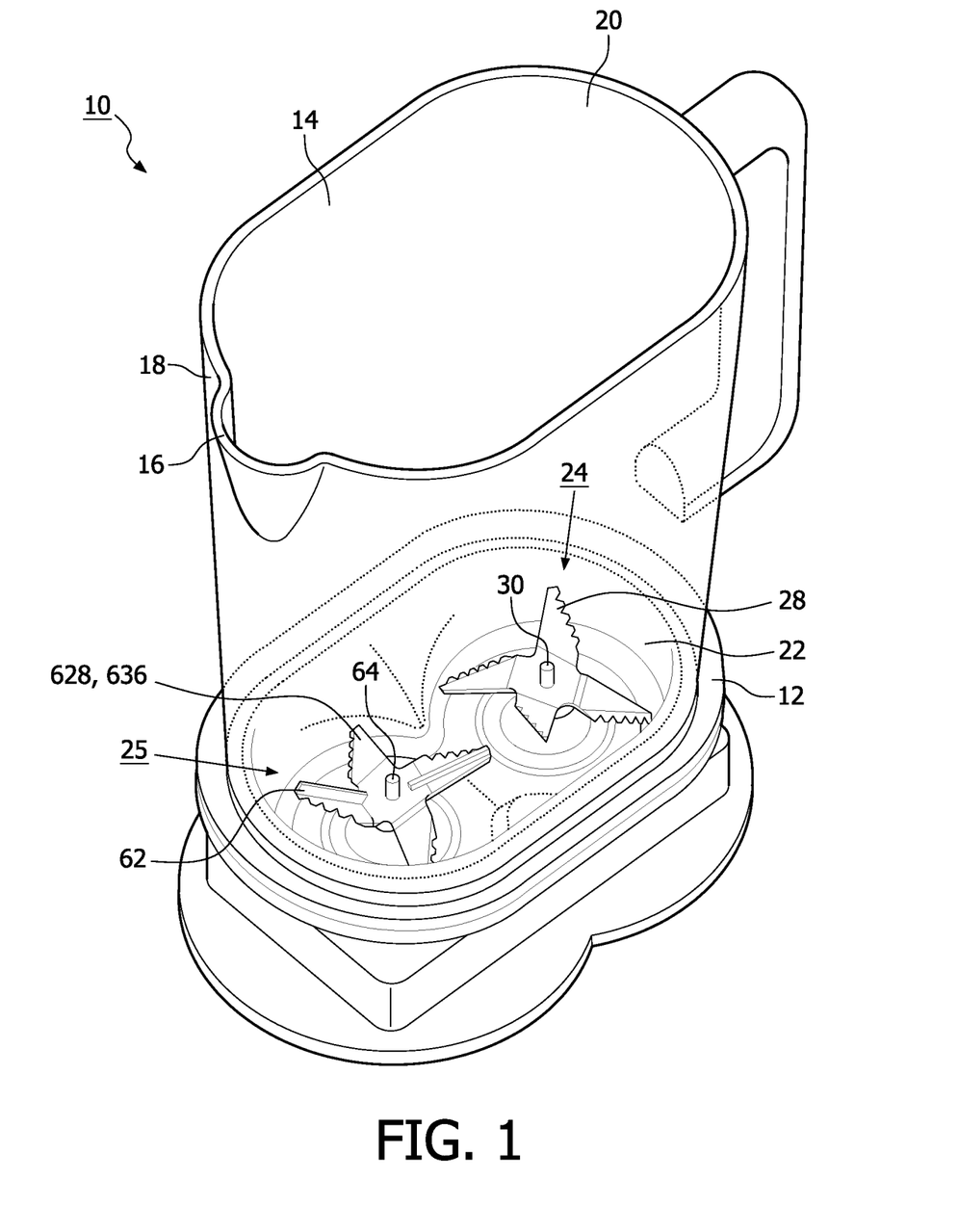
FIG. 1 is a perspective view of a blender system, according to an embodiment of the invention.

FIG. 1 shows an embodiment of a blender system 10 according to the invention. The blender system 10 includes a base 12 and a container 14. The container 14 is mounted to the base 12 such that it is fixed to the base 12 during blending of a mixture of ingredients (not shown). The container 14 may be removable from the base 12, e.g. for purposes of cleaning of the container 14. The container 14 can be made of any material or combination of materials. The container 14 is made of a transparent material to allow the user to observe the blending process and the flow of ingredients in the container 14 during the blending process. However, the material may also comprise another material which not transparent, such as stainless steel. The container 14 has a spout 16 which is formed in a wall portion 18 of the container 14 at an open side 20 of the container 16. The blender base 12 is positioned at a bottom side 22 of the container 14. A cutter assembly 24 and a feeder assembly 25 are accommodated near the base 12. The cutter assembly 24 has a cutter 26 (shown in FIG. 2). The feeder assembly 25 has a feeder 62 (shown in FIG. 3). The feeder 62 is affixed to a feeder shaft 64. The cutter 26 is affixed to a cutter shaft 30. The cutter shaft 30 and the feeder shaft 64 are rotationally driveable by a drive unit 100 which is accommodated in the base 12. The drive unit 100 is not shown. In the following figures like reference numerals indicate like or similar components.

Figure 2:
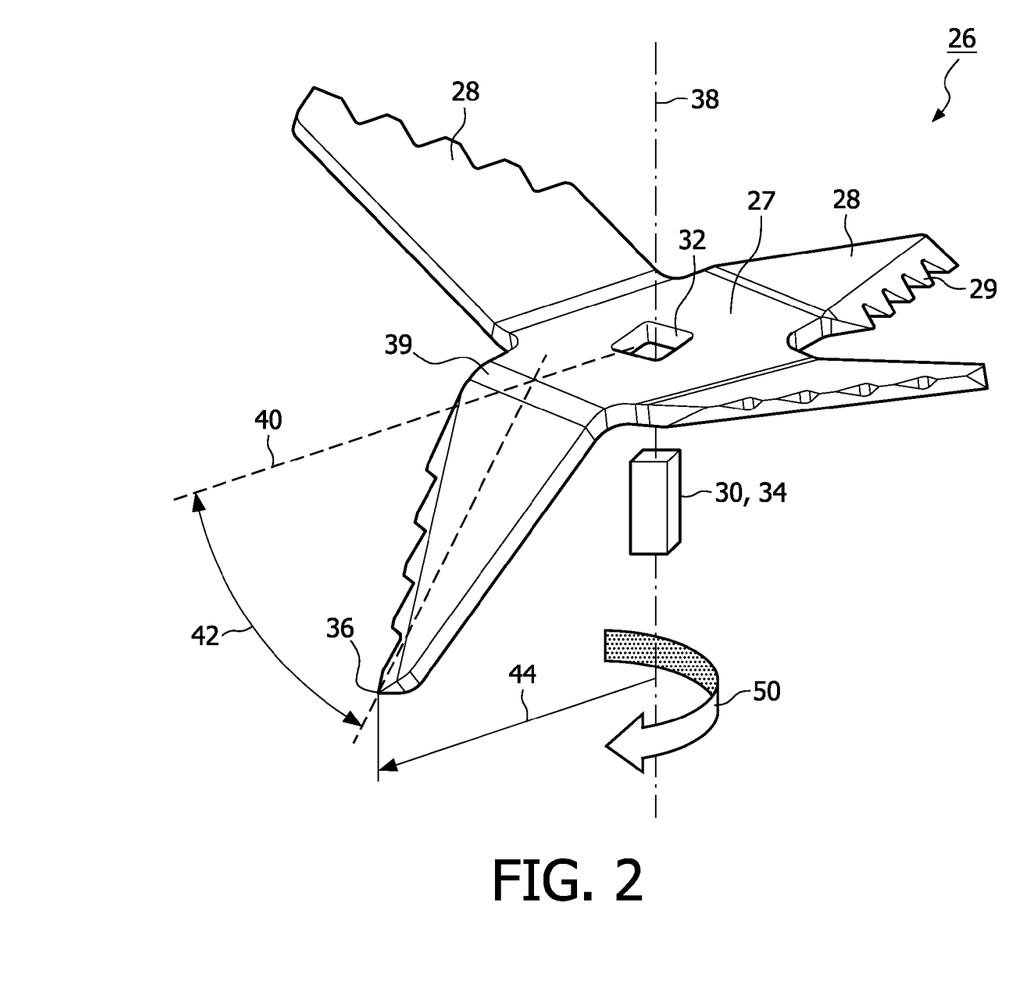
FIG. 2 is a perspective view of a cutter assembly, according to an embodiment of the invention.

In FIG. 2 a perspective view of the cutter 26 of FIG. 1 is depicted. An arrow 50 indicates the intended direction of the rotation of the cutter 26. The cutter 26 can for instance by punched out of a metal sheet. In the embodiment shown in FIG. 2, the cutter has a central section 27 and four sections which form cutter blades 28. The cutter blades 28 are folded around folding lines 39 with respect to the central section 27. Each cutter blade 28 is provided with cutting edges 29. As the blades 28 are folded with respect to the central section 27, the cutting edges 29 can operate at different levels, hereby extending the region of action of the cutter 26 above and under a plane comprising the central section 27. The cutter 26 is depicted decoupled from the cutter shaft 30. Only a portion 34 of the cutter shaft 30 is schematically depicted in FIG. 2. Portion 34 of the cutter shaft 30 corresponds to an opening 32 in the cutter blade 28. The opening 32 is rectangular and corresponds to a rectangular cross-section of portion 34. The opening 32 can alternatively have a different shape, e.g. the shape of an asymmetrical polygon which corresponds to a similar polygon-like cross-section of the portion 34. By using an asymmetrical shape of the opening 32 and an asymmetrical cross-section of portion 34 which corresponds to the opening 32 it is prevented that the cutter blade 28 is mounted upside down after disassembling the cutter system e.g. for purposes of cleaning or servicing.

The central section 27 is perpendicular to an axis of rotation 38 of the cutter 26. Line 40 is parallel with central section 27 and perpendicular to an axis of rotation 38 of the shaft 30. Line 40 intersects with axis 38 in the opening 32. The cutter blades 28 are folded around folding lines 39 over folding angles 42. Each cutter blade 28 of cutter 26 has a cutter tip 36 at a distal end of the blade, i.e. at an end of the blade which is radially remote from the axis of rotation 38. The radial distance between the cutter tip 36 and the axis of rotation 38 is indicated by an arrow 44 and will be referred to as cutter tip radius. The cutter tip radius 44 is dependent on the value of the folding angle 42, on the overall dimension of central section 27 and on the length of the cutter blade. By for example using different folding angles for each cutter blade 28, each blade can be provided with a different cutter tip radius 44 while at the same time extending the region of action of the cutter in the direction of the axis of rotation 38.

Figure 3:
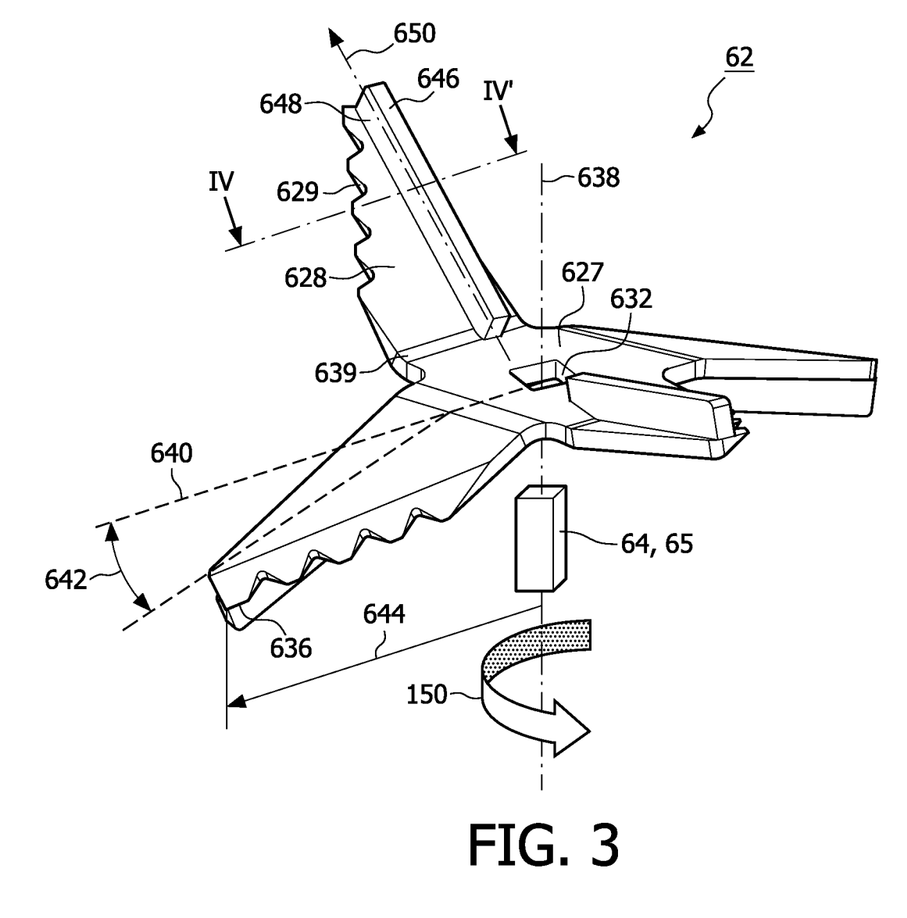
FIG. 3 is a perspective view of a feeder assembly, according to an embodiment of the invention.

In FIG. 3 the feeder 62 of the blender system 10 of FIG. 1 is schematically depicted. An arrow 150 indicates the intended direction of rotation of the feeder 62. The direction of rotation is such particles in and constituents of the blend are exposed to an impact with cutting edges 629 on feeder blades 628. The feeder 62 can by punched out of a metal sheet similar to the cutter 26. In the embodiment shown in FIG. 3, the feeder has a central section 627 and four sections which form feeder blades 628. Alternatively, the feeder can be formed out of two stacked parts in the form of a strip each strip having a central section and two blade section at the extremities of the strip, both strips being connected to the axis via a hole in the central section (not shown). In FIG. 3, the feeder blades 628 are folded around folding lines 639 with respect to the central section 627 similar as indicated in relation to the cutter 26. Each feeder blade 628 is provided with cutting edges 629. These cutting edges 629 pre-cut larger pieces in the blend before these pieces are transported towards the cutter 26. As the blades 628 are folded with respect to the central section 627, the cutting edges 629 can operate at different levels, hereby extending the region of action of the feeder 62 in the direction of an axis of rotation 638 of the feeder 62.

The feeder 62 is depicted as being decoupled from the feeder shaft 64. The feeder 62 can be mounted to the feeder shaft 64 via an opening 632. Only a portion 65 of the feeder shaft 64 is shown in FIG. 3. Portion 65 of the feeder shaft 64 corresponds to an opening 632 in the central portion 627 of the feeder 62. The opening 632 is rectangular and corresponds to a rectangular cross-section of portion 634. The opening can alternatively have different shapes, e.g. the shape of an asymmetrical polygon which corresponds to a similar polygon-like cross-section of the portion 65. By using an asymmetrical shape of the opening and a cross-section of portion 65 which corresponds to the asymmetrical shape of the opening it can prevented that the feeder 62 is mounted upside down after disassembling the feeder assembly 25, e.g. for purposes of cleaning or servicing. Preferably the opening 632 in the feeder 62 should be different from the opening 32 in cutter 26, to prevent the feeder 62 from being regarded as the cutter 26. Such interchange could result to the feeder 62 being mounted to the cutter shaft 30 and vice versa.

The central section 627 is perpendicular to the axis of rotation 638 of the feeder 62. Line 640 is parallel with central section 627 and perpendicular to the axis of rotation 638 of the feeder shaft 64. Line 640 intersects with axis 638 in the opening 632. The feeder blades 628 are folded around folding lines 639 over folding angles. Such a folding angle is indicated by a curved arrow 642. In the embodiment of FIG. 3 the feeder blade 628 has four feeder tips 636. Each blade 628 has a distal end or a feeder tip 636 which is radially remote from the axis of rotation 638. The radial distance between the feeder tip 636 and the axis of rotation 638 is indicated by an arrow 644 and will be referred to feeder tip radius 644.

The feeder tip radius 644 is dependent on the value of the folding angle 642, on the length of the feeder blade and on the dimensions of the central section 627. By using different folding angles for each feeder blade 628, each blade 628 can be provided with a different feeder tip radius 644. By providing the feeder blades 628 with different folding angles 642, the region of action of the feeder can be adapted. The same applies to adaptation of the folding angles 42 of the cutter blades 28 (FIG. 2). In dependence of the cutter tip radii 44 and the feeder tip radii 644 and the angular velocities of the feeder shaft and the cutter shaft, the folding angles 42 and 642 can be chosen such to optimize the effectiveness of the blender system 10.

Figures 4, 5:
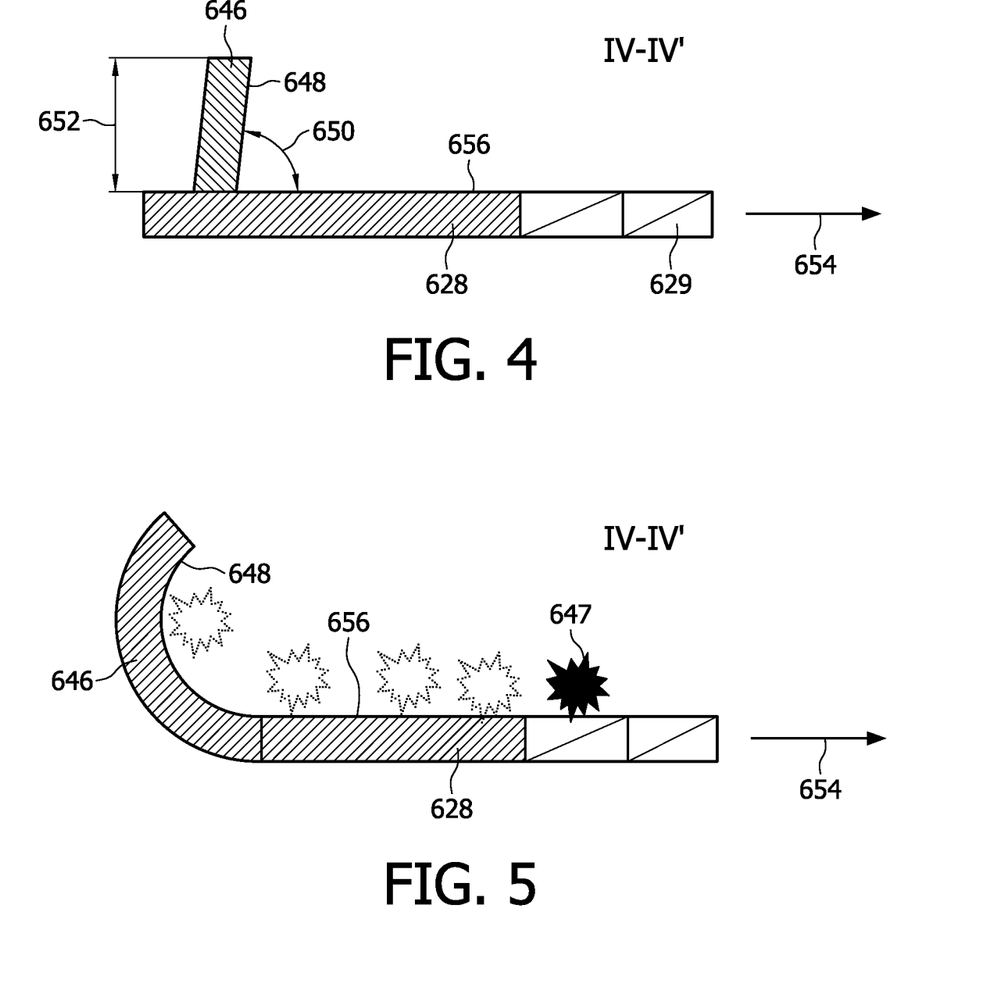
FIG. 4 is a cross section of a feeder blade of a feeder blade of FIG. 3
FIG. 5 is a cross section of a feeder blade according to an embodiment of the invention.

The feeder blades 628 have ribs 646, which extend from the axis of rotation 638 in a radial direction, as indicated by an arrow 650. In the embodiment shown each blade has one rib. Alternatively, the means for transporting may comprise more than one rib per blade, e.g. in the form of two ribs which are arranged in parallel. As different feeder blades 628 may have non-zero folding angles 642, the ribs 646 may not be perpendicular to axis 638. Hence, these ribs also extend in a direction parallel to axis of rotation 638. The ribs 646 have a transporting face or surface 648 which is facing in the direction of the peripheral speed of the feeder tip 636 (FIG. 4). Ingredients of the blend may be pre-cut by the cutting edges 629 of the feeder blades 628. Subsequently to the pre-cutting, the feeder blades 628 move along the pre-cut material. A foremost part of the feeder blade near the cutting edges 629 is narrow and sharp for the purpose of cutting. Such a narrow knife-like shape of the feeder blade is not specifically appropriate for transport of the blend. The transporting face 648 is at an angle with the peripheral speed to obtain sufficient facility to catch ingredients in the blend. The feeder 62 is operated such that the peripheral speed of its tip 636 is less than the peripheral speed of the tip of the cutter 36. A good balance between the cutting and feeding function of the feeder can be obtained if the feeder 62 has transporting surfaces 648. The transporting surfaces 648 catch ingredients in the blend and carry them along in a rotational movement. During this rotational movement centrifugal forces are maintainable between the transporting surfaces and the ingredients which are caught by these surfaces. The transporting surfaces 648 prevent that the ingredients leave the feeder 62 before they reach the region of co-operational proximity between the feeder 62 and the cutter 26. The circulation of blend can effectively be supported.

FIG. 4 shows a cross-section IV-IV' of feeder blade 628 as depicted in FIG. 3. The peripheral speed of a cutting edge 629 is indicated by an arrow 654. The rib 646 is oriented at a sharp rib angle with the top surface of the feeder blade 628. The rib angle is indicated by curved arrow 650. The angle may also have different values. The height of the rib with respect to the top surface 656 of the feeder blade 628 is indicated by an arrow 652. An optimal value for the height 652 is dependent on the peripheral speed of the feeder tip. It was observed that the height of the means for transporting 646 is related to the peripheral speed of the feeder, such that for prevention of forming of cavities in the mixture, the peripheral speed of the feeder tip should be reduced to a preferred value of 60%-80% of the peripheral speed of the cutter tip. Without any means for transporting the mixture such as ribs 646 the reduction of feeder tip peripheral speed the feeding effect is less effective for the blending process than compared to the reduction of the peripheral speed of the feeder tip in combination with means for transporting the blend such as ribs 646. The even more improved feeding effect obtained with ribs 46 is optimal at rib heights 652 between 4 mm and 2 mm, wherein the height of 4 mm is applicable at a peripheral speed of the feeder tip of 60% of the peripheral speed of the cutter tip and wherein the height of 2 mm is applicable at a peripheral speed of the feeder tip of 80% of the peripheral speed of the cutter tip, i.e. the optimal value for the height 652 of the transporting means 646 decreases at increasing peripheral speed of the feeder tip.

FIG. 5 is a cross section of a feeder blade 628 according to an embodiment of the invention. The feeder blade 628 has means 646 for transporting the mixture. In the embodiment of FIG. 5 the means 646 are formed by a folded extension of the feeder blade 628. An advantage of such a folded extension is a continuous transition from the top surface of the feeder blade to a transport face 648. The continuous transition facilitates easy cleaning and prevents that particles or constituents 647 in the mixture or the blend deposit on the transition from top surface 656 to face 648. Such deposit may hinder an effective transport of blend along the feeder assembly. Folding a rear part of the feeder blade 628 as depicted in FIG. 5 is a cost effective way of producing a feeder blade, because folding economizes an extra process step of attaching the transport means 648 to the feeder blade 628.

Figure 6:
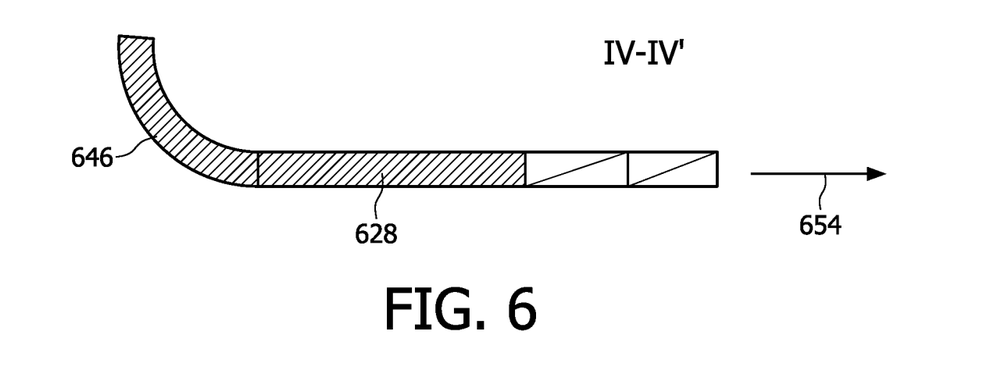
FIG. 6 is a cross section of a feeder blade according to an embodiment of the invention.

FIG. 6 is a cross section of a feeder blade 628 according to an embodiment of the invention. The feeder blade 628 has a curved means of transport 646, however different from the means of transport as depicted in FIG. 5. The extent to which the transporting means 646 is curved is less than depicted in FIG. 5. This results to a different effect in catching behavior. Such a different behavior can be advantageously used to apply a diverse collection of interchangeable feeders for various blending purposes. Various shapes can be used without departing from the present invention.

Figure 7:
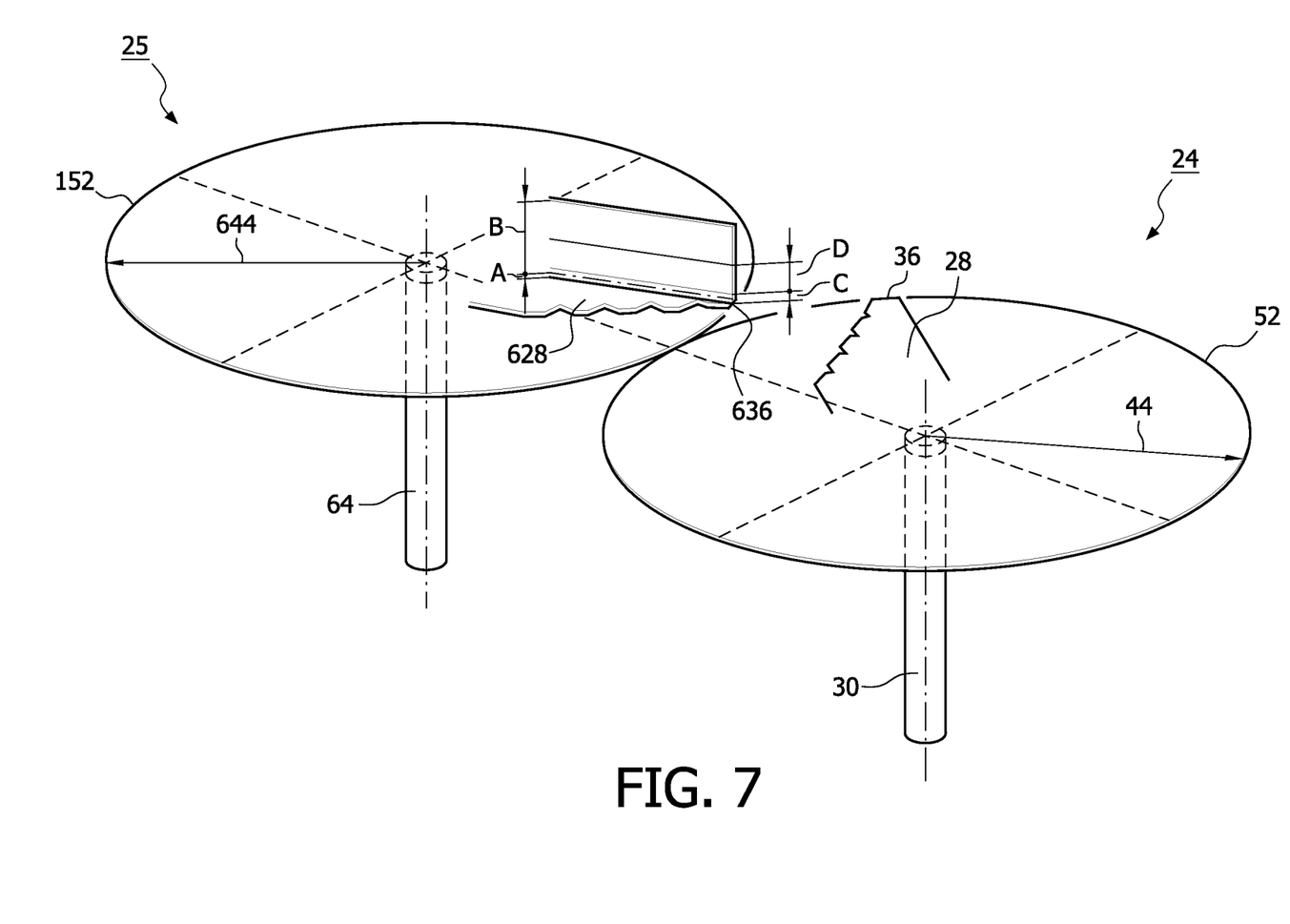
FIG. 7 is a perspective view of an embodiment of feeder and a cutter according to the invention.

FIG. 7 is a perspective view of an embodiment of feeder and a cutter according to the invention. A cutter assembly 24 and a feeder assembly 25 have a cutter blade 28 and a feeder blade 628, respectively. The cutter blade 28 and the feeder blade 628 have a cutter tip 36 and a feeder tip 636, respectively. The cutter tip radius 44 and the feeder tip radius 644 are indicated. The tips 36 and 636 describe circular orbits indicated by circles 52 and 152, respectively. As the cutter tip radius 44 and the feeder tip radius 644 may have different values the diameters of circles 52 and 152 may have different values.

Figure 8:
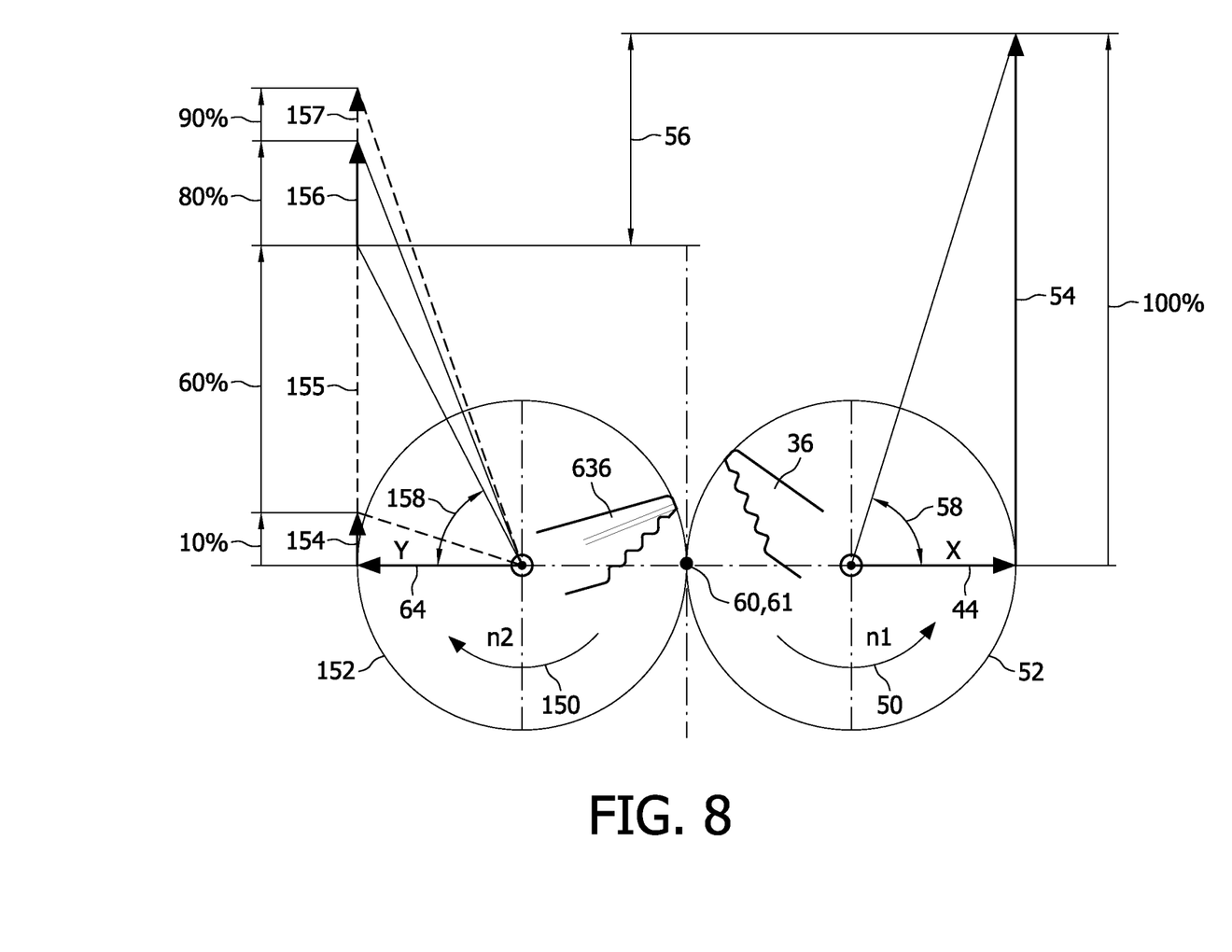
FIG. 8 is a diagram showing circular orbits and velocities of the feeder and the cutter of FIG. 7.

FIG. 8 schematically depicts a top view on the embodiment of FIG. 7. The circular orbits and peripheral velocities of the feeder tip 636 and the cutter tip 36 are diagrammatically indicated. A circle 52 indicates the orbit of the cutter tip 36. The direction of rotation of the cutter 26 is indicated by arrow 50. In the embodiment of FIG. 8 the cutter 26 runs counterclockwise. A circle 152 indicates the orbit of the feeder tip 62. The direction of rotation of the feeder is indicated by arrow 150. In the embodiment of FIG. 8 the feeder 62 runs clockwise. Point 60 indicates the intersection between circle 52 and a line connecting the centers of circles 52 and 152. The peripheral speed of the cutter tip 36 in point 60 is indicated by an arrow 54 at the right side of FIG. 8. Point 61 indicates the intersection between circle 152 and the line connecting the centers of circles 52 and 152. The peripheral speed of the feeder tip 636 in point 61 is indicated by arrows 154 to 157 at the left side of FIG. 8.

A difference in the peripheral speed of the cutter tip 54 and the peripheral speed of the feeder tip 155 is indicated by a doubled headed arrow 56. In this example the cutter tip may driven at a peripheral speed which exceeds the peripheral speed of the feeder tip if the cutter tip and feeder tip have similar radii 44 and 46. An angle which is indicated by arrow 58 corresponds to the angular velocity of the cutter 26. An angle which is indicated by arrow 158 corresponds to the angular velocity of the feeder 62. The peripheral speed difference as indicated by arrow 56 should preferable be positive according to the invention. In a configuration wherein the feeder tip radius is significantly smaller than the cutter tip radius the angular velocity of the feeder may exceed the angular velocity of the cutter while at the same time the feeder tip has a peripheral speed which is lower than the peripheral speed of the cutter tip as according to the invention.

Not shown in FIGS. 7 and 8 is a wall portion of the container in the proximity of the cutter and feeder assemblies. It is advantageous to all embodiments shown if said wall portion of the container is of a shape which ensures that constituents transported by the feeder and leaving a region of action of the feeder are mainly or at least to a large extent transported into a region of action of the cutter. Such a wall portion should preferably closely envelope the orbits which are described by the tips of the feeder but the wall portion should not completely envelope said orbits because an unhindered passage of the constituents transported by the feeder into a region of action of the cutter should be possible along a direct path from the region of action of the feeder into the region of action of the cutter. The feeder is arranged in co-operational proximity of the cutter, i.e. the region of action of the feeder has an overlap with the region of action of the cutter. The overlap is a region where both the feeder and the cutter can affect the mixture. The co-operational proximity extends or can be increased up to a point that the feeder cannot run safely and free without running into a part of the cutter. Such a collision between feeder and cutter can be avoided for example by placing the blades of the feeder and the cutter under different angles with respect to their axes of rotation or by arranging the blades of the cutter and the feeder at different heights. By the latter arrangement at different heights the tips of the feeder and the cutter describe circular orbits in planes which are parallel but non-coinciding. The feeder and the cutter move through a range which can be projected along the axis of rotation of the feeder and the cutter, respectively. Such projections along the axes of the cutter and the feeder of the cutter and feeder ranges, respectively, are of a circular shape as for example shown in FIG. 8.

If the blades of the feeder and the cutter are movable in non-coinciding planes, the feeder can be accommodated in an overlapping arrangement with the cutter, i.e. so close to the cutter that the shortest distance between the axis of rotation of the cutter and the axis of rotation of the feeder is less than the sum of the feeder tip distance and the cutter tip distance. In such an overlapping arrangement the axial projections of the feeder and the cutter slide into each other which results to a composition of two overlapping circles similar to an open eight-shape. The zone where the circles overlap corresponds to a zone of co-operational proximity. Alternatively, the axial projections may not overlap but only touch one another or be separated from each other. Where the axial projections are separated, e.g. by application of small tip distances or a large distance between the axes of rotation of the feeder and the cutter, there is no danger if collision between feeder and cutter, however care should be taken to establish the zone of co-operational proximity.

Figure 9:
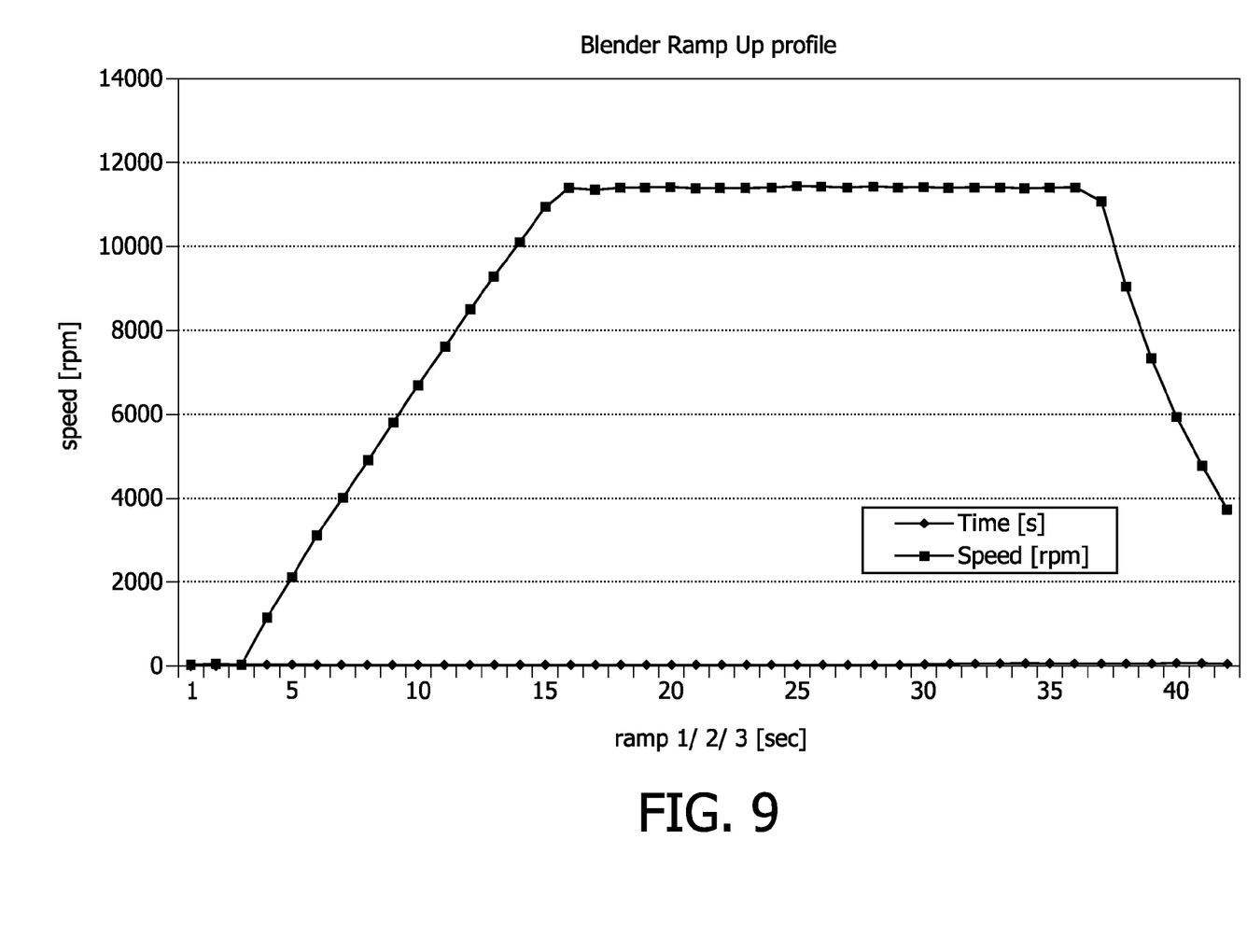
FIG. 9 is a graph showing a predetermined pattern of the angular velocity of a cutter assembly.

FIG. 9 shows how the angular velocity of the cutter can be regulated such that the angular velocity is increased with a moderate angular acceleration. Such a moderate angular acceleration allows the creation of a constant flow of the blend during several stages of blending process. During a first stage the blend comprises mainly uncut pieces, while at the end of the blending process the blend behaves as a homogenous fluid. As the angular velocity of the cutter is moderate at the beginning of the blending process no precautions by the consumer are needed to prevent splashing of the mixture at the start-up of the blending process.

To enable the unmixed and heterogeneous blend to come into a continuous and constant flow, the angular velocity of the cutter can be ramped up continuously in at least three seconds, but preferable more than three seconds. Angular accelerations of the cutter shaft between 50 and 200 rad/s$^2$ showed satisfying results. These results can be obtained at constant angular acceleration or at varying angular acceleration.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein more than two assemblies are present or wherein two or more feeder assemblies cooperate with a cutter assembly. It is possible that the feeder assembly has only a feeding function and that the feeder blades have no cutting edges.

Other variations to the disclosed embodiments can be understood and effected by those skilled in the art in practicing the claimed invention, from a study of the drawings, the disclosure, and the appended claims. It is possible that one or more ribs are provided to each blade of the feeder to establish the means for transport. It is possible that the feeder and the cutter assembly rotate in the same direction instead of in opposite directions.

In the claims, the word "comprising" does not exclude other elements or steps, and the indefinite article "a" or "an" does not exclude a plurality. A single assembly may fulfill the functions of several items recited in the claims such as a feeding and a cutting function. The mere fact that certain measures are recited in mutually different dependent claims does not indicate that a combination of these measured cannot be used to advantage. Any reference signs in the claims should not be construed as limiting the scope.

The invention claimed is:

1. A blender system comprising:
   a cutter assembly comprising:
      a cutter blade affixed to a rotationally driveable cutter shaft, said cutter blade having a cutter tip at a distal end radially remote from the cutter shaft; and
   a feeder assembly including:
      a feeder blade affixed to a rotationally driveable feeder shaft, said feeder blade having:
         a feeder tip at a distal end radially remote from the feeder shaft, and
         means for transporting a mixture towards the cutter assembly, the means for transporting extending over a distance of less than 4 mm and more than 2 mm from a surface of the feeder blade, wherein the feeder shaft and the cutter shaft are driveable by at least one drive unit, and
   the feeder tip is driveable at a lower peripheral speed than a peripheral speed of the cutter tip.

2. A blender system according to claim 1, wherein the feeder tip is driveable at a peripheral speed of more than 10 percent of the peripheral speed of the cutter tip.

3. A blender system according to claim 1, wherein the feeder tip is driveable at a peripheral speed of less than 90 percent of the peripheral speed of the cutter tip.

4. A blender system according to claim 1, wherein the feeder tip is driveable at a peripheral speed between 60 and 80 percent of the peripheral speed of the cutter tip.

5. A blender system according to claim 1, wherein the feeder tip is driveable at a peripheral speed that varies according to a predetermined pattern.

6. A blender system according to claim 1, wherein the feeder shaft has a feeder axis of rotation and the cutter shaft has a cutter axis of rotation, wherein the feeder tip has a feeder tip distance to the feeder axis of rotation and the cutter tip has a cutter tip distance the cutter axis of rotation, wherein a difference between the feeder tip distance and the cutter tip distance is less than 75 percent of the cutter tip distance.

7. A blender system comprising:
   a drive mechanism;
   a cutter assembly affixed to a rotationally driveable cutter shaft connected to said drive mechanism, said cutter assembly comprising a plurality of cutter blades;
   a feeder assembly affixed to a rotationally driveable feeder shaft connected to said drive mechanism, said feeder assembly comprising a plurality of feeder blades, said feeder blades comprising means for transporting a mixture towards the cutter blades, the means for transporting said mixture extending over a distance between 0.5 millimeters and 8 mm from a surface of the feeder blades, wherein said distance is determined based on a peripheral speed of a tip of the feeder blade.

8. A blender system according to claim 7, wherein the feeder tip of the feeder blade is driveable at a peripheral speed between 60 and 80 percent of a peripheral speed of a tip of the cutter blade.

9. A blender system according to claim 7, wherein the tip of the feeder blade is driveable at a peripheral speed that varies according to a predetermined pattern.

* * * * *